United States Patent [19]

Heinz et al.

[11] Patent Number: 5,099,583
[45] Date of Patent: Mar. 31, 1992

[54] INCREMENTAL MEASURING SYSTEM

[76] Inventors: Rieder Heinz, A-5120 St. Pantaleon, St. Pantaleon; Schwaiger Max, A-5121 Ostermiething 298, both of Austria

[21] Appl. No.: 579,885

[22] Filed: Sep. 7, 1990

[30] Foreign Application Priority Data

Sep. 12, 1989 [AT] Austria ................... 2127/89

[51] Int. Cl.⁵ ............................................. G01B 11/04
[52] U.S. Cl. .............................. 33/707; 250/237 G; 356/395
[58] Field of Search .............. 33/707, 706, 708, 701, 33/702; 356/395, 396, 373, 374, 375; 250/237 G

[56] References Cited

U.S. PATENT DOCUMENTS

| | | | |
|---|---|---|---|
| 2,720,810 | 10/1955 | Senn | 356/395 |
| 3,796,498 | 12/1974 | Post | 356/374 |
| 4,063,086 | 12/1977 | Hirose | 356/395 |
| 4,095,903 | 6/1978 | Feichtinger | 33/707 |
| 4,250,381 | 2/1981 | Yoshike et al. | 33/707 |
| 4,499,374 | 2/1985 | Kabaya | 250/237 G |
| 4,549,353 | 10/1985 | Souji | 33/707 |
| 4,564,294 | 1/1986 | Ernst | 33/707 |

FOREIGN PATENT DOCUMENTS

| | | | |
|---|---|---|---|
| 2349944 | 10/1975 | Fed. Rep. of Germany | |
| 0217222 | 9/1988 | Japan | 250/237 G |
| 0136021 | 5/1989 | Japan | 250/237 G |
| 0672680 | 12/1989 | Switzerland | 33/707 |

Primary Examiner—Thomas B. Will
Attorney, Agent, or Firm—Collard, Roe & Galgano

[57] ABSTRACT

The incremental system for measuring lengths comprises a scale member that is provided with a measuring scale and is accommodated in a tubular projective housing, on which the scale member is held at one side edge of the scale member. A scanning unit is guided on the scale member to be movable parallel to the longitudinal direction of the scale member and comprises a light source for illuminating photoelectric receivers with light which is transmitted by a condenser, scanning gratings, the measuring scale and the scale member. A compact structure is obtained in that the scale member extends with an inclination of 45° in the cavity of the carrying housing. The photoelectric receivers are provided on that side of the scale member which is opposite to a slot formed in the housing. The cone of light emitted by the light source is deflected by a reflector disposed between the light source and the condenser. The system is trimmed and the output signals of the receivers are corrected by a new novel process, in which reflector areas associated with reflective material is partly removed from the reflector in areas associated with respective ones of the receivers.

22 Claims, 3 Drawing Sheets

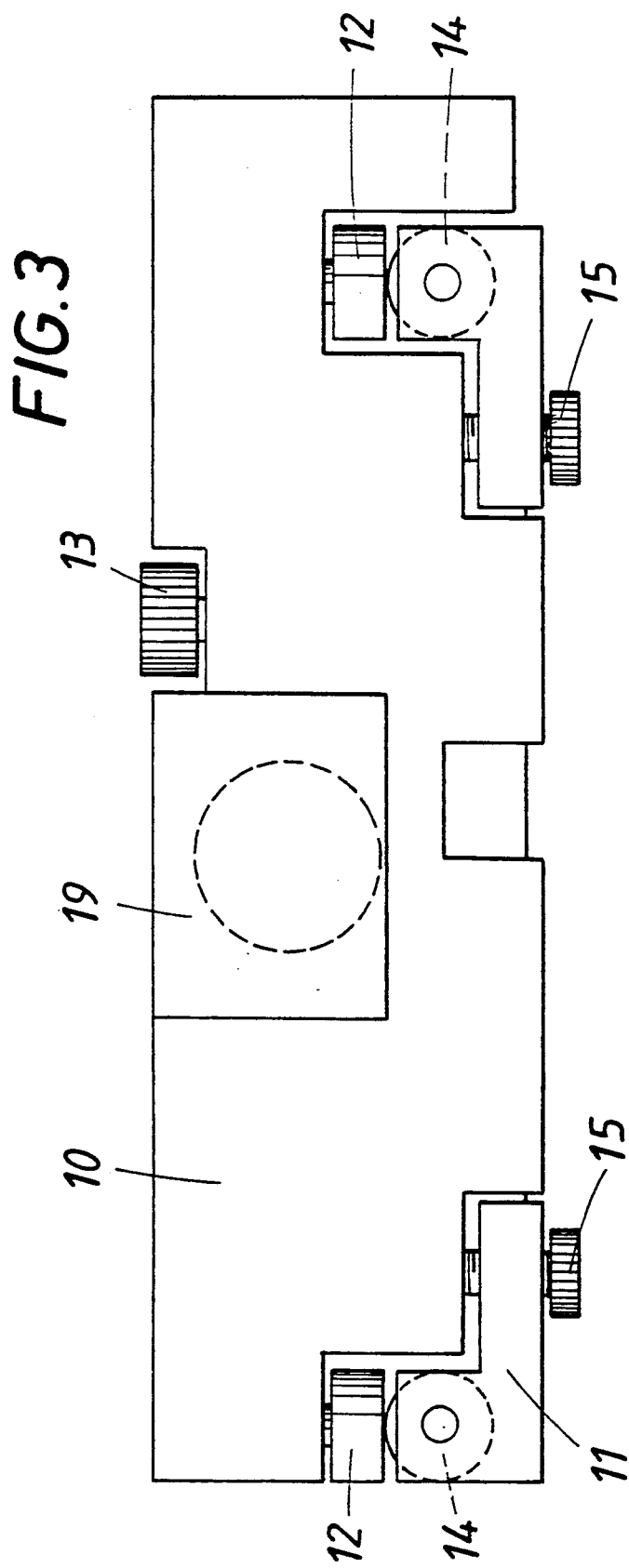
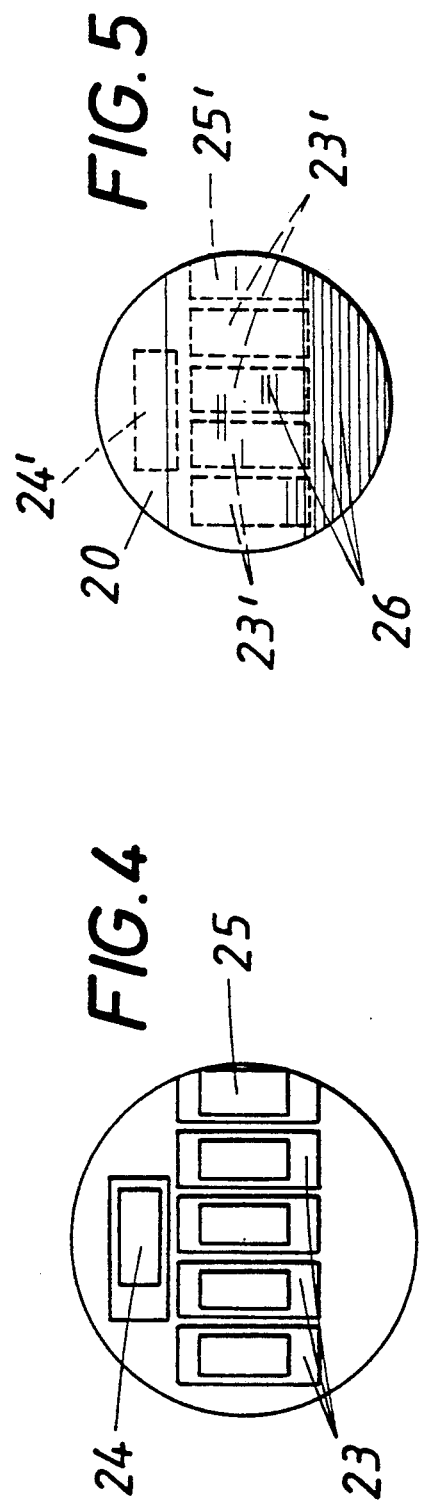

INCREMENTAL MEASURING SYSTEM

BACKGROUND OF THE INVENTION

1. Field of the Invention

This invention relates to an incremental measuring system, particularly for measuring lengths, comprising a scale member, which comprises at least one track provided with a measuring scale and is carried at one side edge by and accommodated in a tubular protective carrying housing, which has a slot, through which at least one actuating member extends, and a scanning unit, which is guided to be movable parallel to the scale member and is provided with a common light source, which is operable to illuminate photoelectric receivers with collimated light that is transmitted via an optical system and through the scale member and the measuring scale and through scanning gratings associated with respective ones of the receivers.

This invention relates also to a process for trimming an incremental measuring system which comprises a scale member that is provided with a measuring scale and which also comprises a scanning unit which is guided to be movable parallel to the scale member and is provided with a common light source, which is operable to illuminate photoelectric receivers through an optical system which comprises a reflector for deflecting light emitted by the light source and condensing means, and through the measuring scale and through scanning gratings associated with the photoelectric receivers so that the latter are illuminated with light which is modulated in response to the movement of the scanning unit relative to the measuring scale.

Such a measuring system may also be used as an angular position detector if a circular scale and a corresponding circular protective housing are employed.

2. Description of the Prior Art

In such measuring systems the measuring scale of the scale member is scanned through the scanning gratings with transmitted light. The use of a single light source affords the advantage that the power requirement is low and that the measuring field will be illuminated rather uniformly. On the other hand, the light path between the light source and the condenser involves a considerable space requirement so that the tubular protective and carrying housing must have a large inside width. Whereas it is known to transmit the light through optical fibers, they will add to the cost of the entire system and involve considerable light losses. In measuring systems in which scanning is effected with reflected light and a scale strip is used, the scanning unit is provided at the top of the protective housing and the scale strip is supported by said housing top at its center, it is known that the light source of the illuminating means is arranged in the scanning unit at a longitudinal distance from the location at which the scale is currently scanned and the cone of light emitted by the light source is deflected by a mirror. Such an arrangement will involve a large overall length of the scanning unit and problems will arise in connection with the guiding of the scanning unit and its coupling to an actuating member for displacing the scanning unit. As has been mentioned that arrangement can be used only if the measuring strip has a reflective measuring scale and extends horizontally at the top of the tubular housing. In known arrangements having a single light source, difficulties have been involved in the adjustment of the photoelectric receivers. Photoelectric receivers often vary substantially in their response so that their output signals may differ by as much as 15% in case of the same illumination. In the previous practice such differences between the responses of several receivers have been compensated by circuits which include adjustable potentiometers and succeed respective receivers so that the d.c. components otherwise occurring in the signals will be suppressed if the receivers are arranged in back-to-back connections in the usual manner. In addition to differences in the signal amplitude, another error which may occur is the so-called phase error, which resides in that the phase displacement of the signals which are produced by the receivers in response to the light received through the scanning gratings are not equal to the desired phase displacements usually amounting to 90 and 180 degrees, respectively, but differ from said desired values. For the compensation of that phase error it is also usual to provide compensating circuits which succeed the receivers and which are expensive and just as potentiometers tend to age in the course of time. Besides, the total illumination will also change as a result of the performance of the light source or of the optical transmittance of the light-transmitting media. In simple measuring systems it is hardly possible to ensure that the output signals will have a desired waveform, such as a pure sine shape or triangular shape. This can be accomplished only by means of expensive circuitry, particularly by means of a microprocessor, and this will also involve a high expenditure for the circuitry and the adjustment which is required.

It is known, e.g., from Published German Application 23 49 944 that the scale member extends with an inclination, particularly of 45°, into the cavity of the carrying housing from that side of said housing which is opposite to the slot. In that case the entire scanning unit or only the scanning plate which contains the scanning gratings is guided directly on the scale member, which protrudes into the cavity, and a backlashfree coupling is desired between the scanning unit and the actuating member which is connected to the pickup provided on the machine tool or the like. In said known arrangement the scanning plate and the photoelectric receivers are guided on the underside of the scale member and a separate light source consisting of a light-emitting diode is provided for each receiver and is held by a separate carrier on the other side of the scale member. In that case each light-emitting diode can be adjusted to vary its spacing from the scale member so that the illumination of the associated photodetector is individually altered. But that arrangement can only be provided if large distances are provided between the several scanning gratings, receivers and illuminating means so that a large overall space requirement, a large luminous power and an expensive structure will be required. In systems comprising photodetectors associated by respective light sources it is also known to provide the light sources consisting, e.g., of light-emitting diodes, in perforated plates and to adjust the actual light output by means of screws or the like which protrude into the apertures in the plate. But in that case the compensation will be inaccurate and will require an expensive adjustment and a correspondingly bulky structure will be required.

SUMMARY OF THE INVENTION

An object of the invention is to provide a measuring system which is of the kind described first hereinbefore and which combines the illumination from a single light source, a small overall size and a close spacing of the receivers with the possibility that the scanning unit can be guided on the scale member. The structure should be compact and, in particular, the carrying housing should have a small width.

Another object of the invention is to provide a process which is of the kind described hereinbefore and which permits in such measuring systems a lasting and exact compensation of any variation of the amplitudes of the output signals of the receivers and, in case of need, also the adjustment of a desired waveform of said signals.

The first object set forth above is accomplished in that the scale member is rectangular in cross-section and protrudes at an oblique angle into the cavity of the carrying housing from that side which is opposite to the slot, that portion of the scanning unit which carries the photoelectric receivers is disposed on that side of the scale member which is opposite to the slot of the housing, the light source is provided on the other side of the scale member between said scale member and said slot and the cone of light emitted by the light source is deflected by at least one reflector disposed between said light source and said condensing means.

In a preferred embodiment of the invention the principal axis of the light emitted by the light source is parallel to the major plane of the scale member and the light source and the reflector, which has a vertical reflective surface, are disposed in the space which is defined by the vertical planes which contain the extreme side edges of the scale member, which protrudes into the cavity of the carrying housing with an inclination of 45°. In that case the scanning unit may be so designed that its cross-section, inclusive of the required elements and the path required for the projection of the light, will occupy a major part of the cavity which is available in the carrying housing. Only a small space will be required below the bottom edge of the structure which is required in the scanning unit for the guidance on the scale member.

In a preferred embodiment of the invention, the scanning unit is directly guided on the scale member by means of sliders or rollers, the scanning gratings are provided in a scanning plate on that side of the scale member which faces the condenser, and the scanning plate, the light source, the reflector and the condenser are mounted on a carrying member which is adjustable relative to the carrying member which carries the photoelectric receivers. For instance, if a "squinting" light-emitting diode is used as a light source, the optimum illumination of the photoelectric receivers can be adjusted and it will be possible to compensate possible deviations of the positions of the scanning gratings of the scanning plates relative to the measuring scale from desired positions.

In the last-mentioned embodiment the member which carries the scanning plate may be provided with separate sliders or rollers for supporting said member on the scale member and can be adjusted at least parallel to that side face of the scale member which faces the scanning plate in that said plate-carrying member is adjusted in the longitudinal direction of the scale and transversely thereto and/or by a rotation about an axis which is normal to the adjacent broadside surface of the scale member. In that case the plate-carrying member will be supported by means of separate sliders or rollers and the broadside surfaces of the scanning plate will be parallel to the major plane of the scale member, as will be desired in most cases.

That member of the scanning unit which carries the photoelectric receivers may also be provided with separate sliders or rollers supported on the scale member and the rollers for supporting the scanning plate-carrying member and the receiver-carrying member on the scale member may consist of miniature ball bearings. Such an arrangement will ensure that the adjusted relative position of said two carrying members of the scanning unit will permanently be maintained.

It has been mentioned hereinbefore that in the previous systems comprising a single light source, and particularly in such systems comprising small photoelectric receivers, e.g., in a size of 1×2 mm, it has hardly been possible to adjust the response by an adjustment of the luminous intensity. In the arrangement in accordance with the invention, a novel approach is adopted in measuring systems in which a light cone is deflected by a reflector.

In a process of the kind described hereinbefore, the second object set forth hereinbefore is accomplished in that the illuminating capacity of the means for illuminating each photoelectric receiver is adjustable by a change of the reflecting properties of the reflector in those areas in which the light from the light source is deflected to respective scanning gratings and respective photoelectric receivers associated therewith. That process is basically applicable to all measuring systems defined in the second paragraph of this description, inclusive of measuring systems in which the scale member is provided with a reflective measuring scale. But it will be particularly advantageous to use that process for a trimming of measuring systems by which the first object set forth hereinbefore is accomplished.

The adjustment of the illumination may be employed to compensate the variation of the amplitudes of the outputs signals of the photoelectric receivers so that in back-to-back connections comprising pairs of said receivers the d.c. component of the output signals will be eliminated and succeeding compensating circuits will not be required.

In a preferred embodiment of the process the phase displacements of the output signals of the photoelectric receivers are adjusted by change of the reflecting properties of the reflector in those areas which are associated with respective photoelectric receivers. Besides, the waveform of the output signals of the receivers can be controlled and adjusted by a change of the reflecting properties of the reflector in the areas which are associated with respective receivers and it is possible, e.g., thus to produce sine or triangular signals. The reflecting properties are preferably changed in that the reflection factor of the reflector is changed in discrete areas, e.g., in that reflective material is eliminated from the reflector in discrete areas in a predetermined pattern consisting, e.g., of dot or line elements.

In a preferred embodiment of the process, the adjustment of the output amplitudes of the receivers by a change of the reflecting properties of the associated areas of the reflector is preceded by a step in which that member which carries the scanning plate is so adjusted relative to that member of the scanning unit which carries the photoelectric receivers that the output signals of the receivers have a predetermined, particularly a maximum amplitude.

In a preferred embodiment of the process those reflecting areas of the reflector which are associated with respective photoelectric receivers and scanning gratings are empirically defined in that the reflector is illuminated with collimated light through a mask, which is positioned to replace the photoelectric receivers and has apertures corresponding in area and position to the photoelectric receivers. Said areas can empirically be determined by visual observation or in that a layer of photographic material is provided on a test reflector and is illuminated through the mask and subsequently developed. In the zones which have thus been defined the reflective material can then be removed in part in a selected pattern and the phase spacing, the signal amplitude and the signal waveform can thus be influenced. The various reflective areas may also be defined by calculation in accordance with optical laws.

In a preferred embodiment of the process, the reflecting properties are changed by a controlled vaporization by means of a laser of areas of the reflective material in defined areas of a reflector consisting of a mirror.

That embodiment permits in series production the use of a computer for controlling the laser beam and such computer may be programmed to receive the corrected output signals from the respective receivers and to use said signals for determining those areas in which the reflective layer is to be removed or for a selection of said areas from corresponding stored data and to control the laser beam in accordance therewith. The reflective layer may be removed in iterative steps and after each step the computer may compare the output signals of the receivers with the desired signals as regards amplitude and/or waveform. The reflective layer may also be removed by mechanical processes.

BRIEF DESCRIPTION OF THE DRAWING

FIG. 3 is a fragmentary top plan view showing the scanning unit of the system of FIGS. 1 and 2.

FIG. 4 is an elevation showing the arrangement of the photoelectric receivers of the system of FIGS. 1 and 2.

FIG. 5 is an elevation showing a portion of the reflective surface of a mirror which constitutes the reflector.

DETAILED DESCRIPTION OF THE PREFERRED EMBODIMENT

Figure 1:
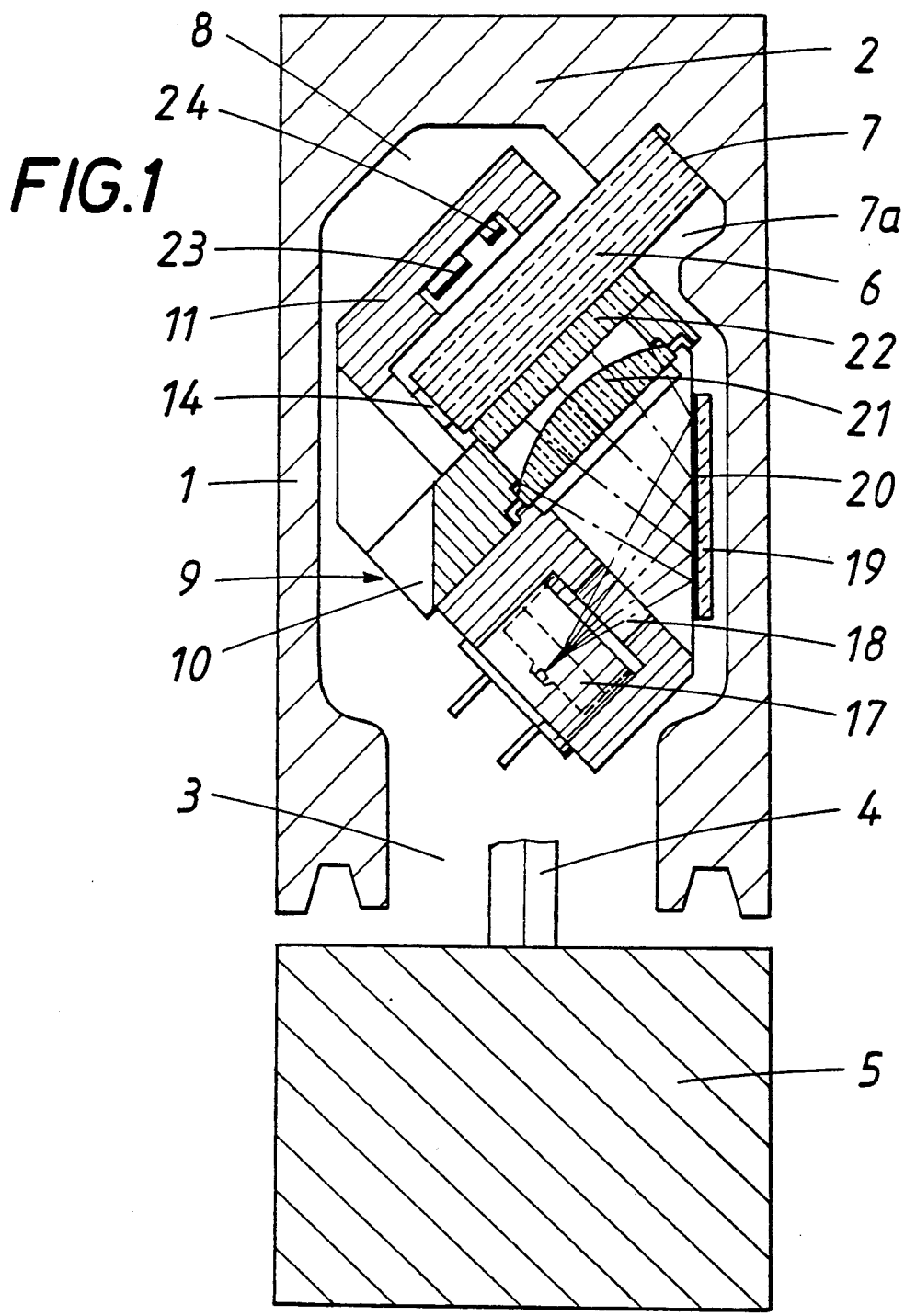
FIG. 1 is a transverse sectional view showing an incremental system for measuring lengths.
Figure 2:
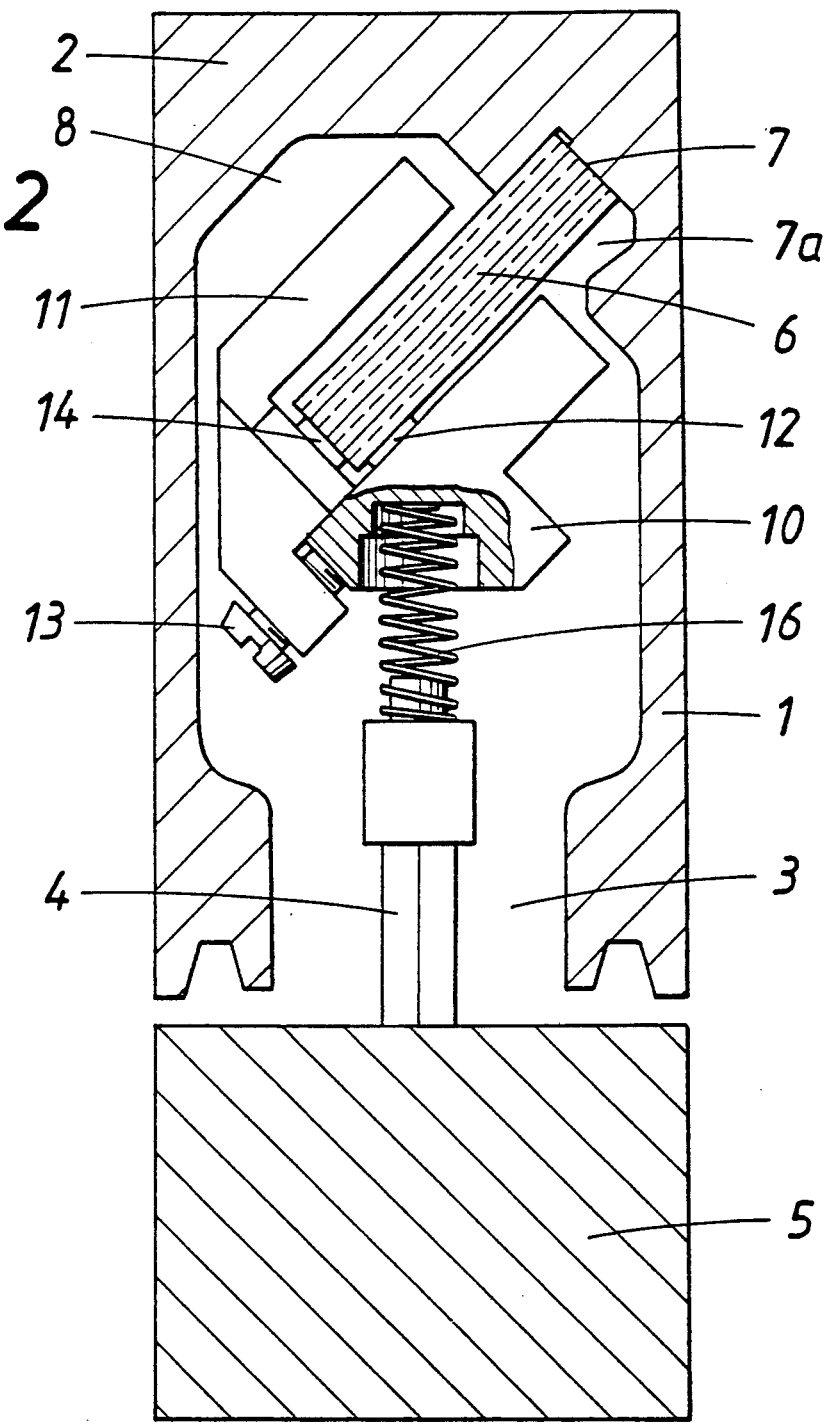
FIG. 2 is a sectional view showing the measuring system of FIG. 1 and taken on a plane which is parallel to the section plane of FIG. 1.

Further details and advantages of the invention will become apparent from the following description of an embodiment of the invention shown on the drawing.

The measuring system comprises a tubular protective housing 1, which has a top 2 that is reinforced to constitute a carrier. The housing 1 is formed in its bottom with a slot 3, which is usually closed by sealing lips, not shown, which resiliently bear on each other. A swordlike actuating member 4 is coupled to an externally disposed movable member 5 and extends through the slot 3 between the lips. The movable member 5 is coupled to an element for which the length or the longitudinal displacement relative to a stationary scale member is to be measured.

A scale member 6 is provided, which has the shape of a flat rectangle in cross-section and consists of a transparent material, particularly glass. One side edge portion of the scale member 6 has been inserted into a groove 7 provided at the junction between one side wall of the tubular protective housing 1 and the top 2 of that housing. That side edge portion of the scale member 6 is retained in the groove 7 by resilient means, such as a suitable adhesive, a suitable sealant or a rubber cord that has been forced into the groove 7 in a gap 7a disposed on one side of the scale member 6. A major portion of the scale member 6 protrudes from the groove 7 into the cavity 8 of the protective and carrying housing 1 at an angle of 45° to the vertical direction in which the top and bottom of the housing are spaced apart and to the direction in which the side walls of the housing 1 are spaced apart. In the embodiment shown the scale member 6 is provided on one track with an incremental measuring scale consisting of fine graduations and may be provided with reference marks in a second track. It is known that incremental measuring scales are available with increments as small as a micrometer.

A scanning unit 9 is provided for reading the scale and for generating analog measured-value signals as a result of such scanning. In the embodiment shown that scanning unit comprises two carrying members 10 and 11. The member 10 is provided with two rollers 12, which consist of ball bearings bearing on the lower broadside surface of the scale member 6. The carrying member 11 is provided with two ball bearings 14 bearing on the lower edge face of the scale member 6. The carrying member 10 can be adjusted relative to the carrying member 11 by means of adjusting screws 13, 15 and can be fixed in its adjusted position by additional screws. By that adjustment, optical illuminating means provided on the member 10 can be adjusted relative to photoelectric receivers mounted on the member 11.

The ball bearings 12 and 14 are respectively guided on the lower broadside surface and the lower edge face of the scale member 6 and are urged against said guiding surfaces by one or more compression springs 16, which bear on the actuating member 4. A movement along the slot 3 is imparted to the scanning unit 9 by the actuating member preferably by means of permanent magnets or magnet-armature combinations which are constantly in engagement with each other and have crossing confronting cambered surfaces so that they are in point contact with each other.

In the embodiment shown the light source consists of a light-emitting diode 17, which emits a cone of light through an aperture diaphragm 18 onto a mirror 19, which is also secured to the carrying member 10 and comprises a reflective surface that consists of a noble metal, particularly gold, applied by vapor deposition. The mirror 19 deflects the cone of light that has been emitted by the light source 17 and projects it to condensing means 21, which emit collimated light. A scanning plate 22 is provided with scanning gratings consisting of scanning gratings which are offset by fractional parts of an increment of the scale on the scale member 6 and of an additional scanning grating for scanning reference marks provided on a reference track. That scanning plate 22 is moved by the scanning unit 9 along the scale member 6. The measuring scale is illuminated by the illuminating means 17 to 22 through the scanning gratings and the light which has been transmitted through the scanning gratings and the measuring scale is transmitted further by the scale member 6 to fall on photoelectric receivers 23, 24, 25 mounted on the member 11. The receivers 23 shown in FIG. 4 are provided for generating measured-value signals, which are displaced in phase relative to each other and in an ideal case have the relative phase angles of 0, 90, 180 and 270 degrees. Said receivers are arranged in pairs in back-to-back connections so that the receivers generate two output signals, which are at phase quadrature and are then subjected to further processing.

The receiver 24 is associated with the reference track on the scale member 6 and is intended to generate a reference pulse in response to the scanning of a reference mark on said track. The photoelectric receiver 25 is provided to detect the average brightness as an indication of the instantaneous light output of the light source so that a decrease of the illumination of the receivers resulting from an ageing or soiling will be detected. The receiver 25 may also be used to determine a reference level for the reference pulse.

For trimming the measuring system, it is preferred first to adjust the carrying member 10 relative to the carrying member 11 until the output signal of each of the receivers 23 to 25 has the largest possible amplitude. Thereafter, the reflective layer 20 is removed in part, particularly by means of a laser beam, in order to determine the signal amplitude, phase position and waveform of the signals. FIG. 5 is a diagrammatic showing of the reflective layer 20 of the reflector 19 and, in dash lines, the outlines 23', 24', 25' of the empirically determined reflective areas associated with respective receivers 23, 24, 25. To influence the amplitude, phase displacements and waveform of the output signals of the photoelectric receivers, partial areas of the reflective layer shown in FIG. 5 are removed by means of a computer-controlled laser beam along lines 26 in accordance with a predetermined program. A removal of the reflective layer 20 in dot- or linelike areas might also be adopted and the phase position and the waveform of the signals can be influenced by a removal of the reflective layer near the side edges of the contour lines 23'.

The design drawing may be utilized for a definition of the areas 23' to 25'. But it will be simpler and in many cases more accurate to replace the reflector 19 for the determination of the areas 23' to 25' by a member which instead of the reflective layer 20 is provided with a layer of photographic material and to replace the photoelectric receivers 23 to 25 by respective aperture diaphragms which have the same contours and positions as said receivers. Collimated light is then passed through said aperture diaphragms and is transmitted by the scale member 6, the scanning plate 22 and the condenser 21 and is then incident on the photographic layer. The latter is then developed to provide an image of the desired reflective areas.

We claim:

1. In an incremental measuring system comprising
    a tubular housing defining an internal cavity and having a slot, which extends along said housing and opens into said cavity,
    a scale member, which is accommodated in said cavity and has a side edge portion extending along said slot and held by said housing and an incremental measuring scale extending along said side edge portion,
    a scanning unit, which is accommodated in said cavity and is mounted to be movable along said scale and comprises a plurality of scanning gratings, a plurality of photoelectric receivers associated with respective ones of said gratings, a common light source for emitting light and an optical system for illuminating said receivers through said scale, said scale member and said gratings with collimated light from said light source so as to produce a respective output signal from each of said receivers, said optical system comprising condensing means for collimating said light before it falls on said scale member, said scale, and said gratings,
    the improvement residing in that
    said housing has a mounting portion, which is spaced in cross-section in a predetermined direction from said slot and in which said side edge portion is held,
    said scale member has in cross-section the shape of a rectangle and extends into said cavity at an oblique angle to said predetermined direction,
    said cavity has a first cavity portion disposed between said scale member and said mounting portion and a second cavity portion disposed between said scale member and said slot,
    said scanning unit comprises a first carrying member disposed in said first cavity portion and provided with said receivers,
    said light source and said condensing means are disposed in said second cavity portion, and
    reflecting means for deflecting light from said light source to said condensing means are included in said optical system and disposed in said second cavity portion wherein the reflective properties of at least a portion of said reflective means is changeable to modify the illumination of an associated one of said receivers to compensate any deviation in the amplitude of the output signal of said one receiver from the amplitude of the output signal from any one of the other receivers.

2. The improvement set forth in claim 1 as applied to a system for measuring lengths.

3. The improvement set forth in claim 1 as applied to a system comprising an actuating member which extends through said slot and is coupled to said scanning unit and operable to move said scanning unit along said slot.

4. The improvement said forth in claim 1, wherein
    said scale member has a principal longitudinal plane and parallel first and second broadside surfaces extending on opposite sides of said principal plane and adjoining said first and second cavity portions, respectively,
    said light source is operable to emit light on a main axis which is parallel to said principal plane,
    said scale member protrudes from said mounting portion at an angle of 45° to said predetermined direction and has a first extreme side edge on the inside of said first broadside surface and a second extreme side edge at the outside of said second braodside surface,
    said reflective means has a reflective surface extending in said predetermined direction, and
    said light source and said reflective means are accommodated in said second cavity portion within a space defined by two planes extending in said predetermined direction and including said first and second extreme side edges of said scale member.

5. The improvement set forth in claim 4 as applied to a system in which said predetermined direction is vertical.

6. The improvement set forth in claim 1, wherein
    said scanning unit is provided with low-friction means in contact with said scale member,
    said scanning unit comprises a scanning plate, which is disposed in said second cavity portion between said scale member and said condensing means and is provided with said scanning gratings, and said scanning unit comprises a second carrying member, which is adjustable relative to said first carrying member and carries said scanning plate, said light source, said reflecting means and said condensing means.

7. The improvement set forth in claim 1, wherein said low-friction means comprise sliders.

8. The improvement set forth in claim 6, wherein said low-friction means comprise rollers.

9. The improvement set forth in claim 8, wherein said rollers consist of miniature ball bearings.

10. The improvement set forth in claim 6, wherein said
   second carrying member is provided with low-friction means in contact with said scale member and
   said scale member has a broadside surface adjoining said second cavity portion and
   said second carrying member is adjustable relative to said first carrying member parallel to said broadside surface.

11. The improvement set forth in claim 10, wherein said second carrying member is movable relative to said first carrying member for at least one of the following adjustments:
   a) adjustment along said scale member;
   b) adjustment transverse to said scale member;
   c) pivotal adjustment on an axis which is normal to said broadside surface.

12. The improvement set forth in claim 10, wherein said low-friction means consist of rollers which constitute miniature ball bearings.

13. The improvement set forth in claim 10, wherein said first carrying member is provided with low-friction means in contact with said scale member.

14. The improvement set forth in claim 13, wherein said low-friction means of said first carrying member consist of rollers which constitute miniature ball bearings.

15. The improvement set forth in claim 1 as applied to a system in which
   said receivers are illuminated with modulated light and generate said respective output signals in response to said modulated light when said light source is operated to emit said light as said scanning unit is moved along said scale and wherein
   said reflecting means comprise a plurality of reflective surface areas for deflecting light for illuminating respective ones of receivers through respective one of said gratings, and
   at least two of said reflective surface areas have different reflecting properties which are so selected that the illumination of said at least two receivers is so controlled that the output signals of said at least two receivers have equal amplitudes.

16. In a process of trimming an incremental measuring system comprising
   a tubular housing defining an internal cavity and having a slot, which extends along said housing and opens into said cavity,
   a scale member, which is accommodated in said cavity and has a side edge portion extending along said slot and held by said housing and an incremental measuring scale extending along said side edge portion,
   a scanning unit, which is accommodated in said cavity and is mounted to be movable along said scale and comprises a plurality of scanning gratings, a plurality of photoelectric receivers associated with respective ones of said gratings, a common light source for emitting light and an optical system for illuminating said receivers through said scale, said scale member and said gratings with collimated light from said light source, said optical system comprising condensing means for collimating said light before it falls on said scale member, said scale, and said gratings,
   whereby said receivers are illuminated with modulated light and generate respective output signals in response to said modulated light when said light source is operated to emit said light as said scanning unit is moved along said scale and wherein
   said housing has a mounting portion, which is spaced in cross-section in a predetermined direction from said slot and in which said side edge portion is held,
   said scale member has in cross-section the shape of a rectangle and extends into said cavity an an oblique angle to said predetermined direction,
   said cavity has a first cavity portion disposed between said scale member and said mounting portion and a second cavity portion disposed between said scale member and said slot,
   said scanning unit comprises a first carrying member disposed in said first cavity portion and provided with said receivers,
   said light source and said condensing means are disposed in said second cavity portion,
   reflecting means for deflecting light from said light source to said condensing means are included in said optical system and disposed in said second cavity portion, and
   said reflecting means comprise a plurality of reflective surface areas for deflecting light for illuminating respective ones of said receivers through respective ones of said gratings,
   the improvement residing in that
   the reflecting properties of at least one of said reflective surface areas are changed to modify the illumination of the associated receiver to compensate any deviation of the output signal of said one receiver from the amplitude of the output signal of another one of said receivers.

17. The improvement set forth in claim 16 as applied to a process in which predetermined phase displacements are desired to be provided between consecutive output signals from respective ones of said receivers, wherein
   the reflecting properties of at least one of said reflective surface areas are changed to modify the illumination of the associated receiver so that the output signal of said one receiver has the desired phase displacement from the output signal of another one of said receivers.

18. The improvement set forth in claim 16, wherein said first carrying member is adjusted relative to said second carrying member to a position in which the output signal of at least one of said receivers has a predetermined amplitude before the reflecting properties of said at least one reflective surface area are thus changed.

19. The improvement set forth in claim 16 wherein the reflecting properties of at least one of said reflective surface areas are changed to modify the illumination of the associated receiver so that the output signal of said one receiver has a predetermined waveform.

20. The improvement set forth in claim 16, wherein said first carrying member is adjusted relative to said second carrying member to a position in which the output signal of each of said receivers has a maximum amplitude before the reflecting properties of said at least one reflective surface area are thus changed.

21. The improvement set forth in claim 16, as applied to a process in which said reflecting means are constituted by an integral reflector, wherein a mask having apertures conforming to said receivers is so arranged relative to said reflector that said apertures are in positions corresponding to those of said receivers and said reflector is illuminated through said mask and said condensing means with collimated light defining said reflective surface areas on said reflector.

22. The improvement set forth in claim 16 as applied to a process in which said reflecting means are constituted by a reflective layer of a mirror, wherein said reflecting properties of said at least one reflective surface area are changed in that parts of said layer are vaporized in said at least one reflective surface area by a controlled laser beam.

* * * * *